Figure 1:
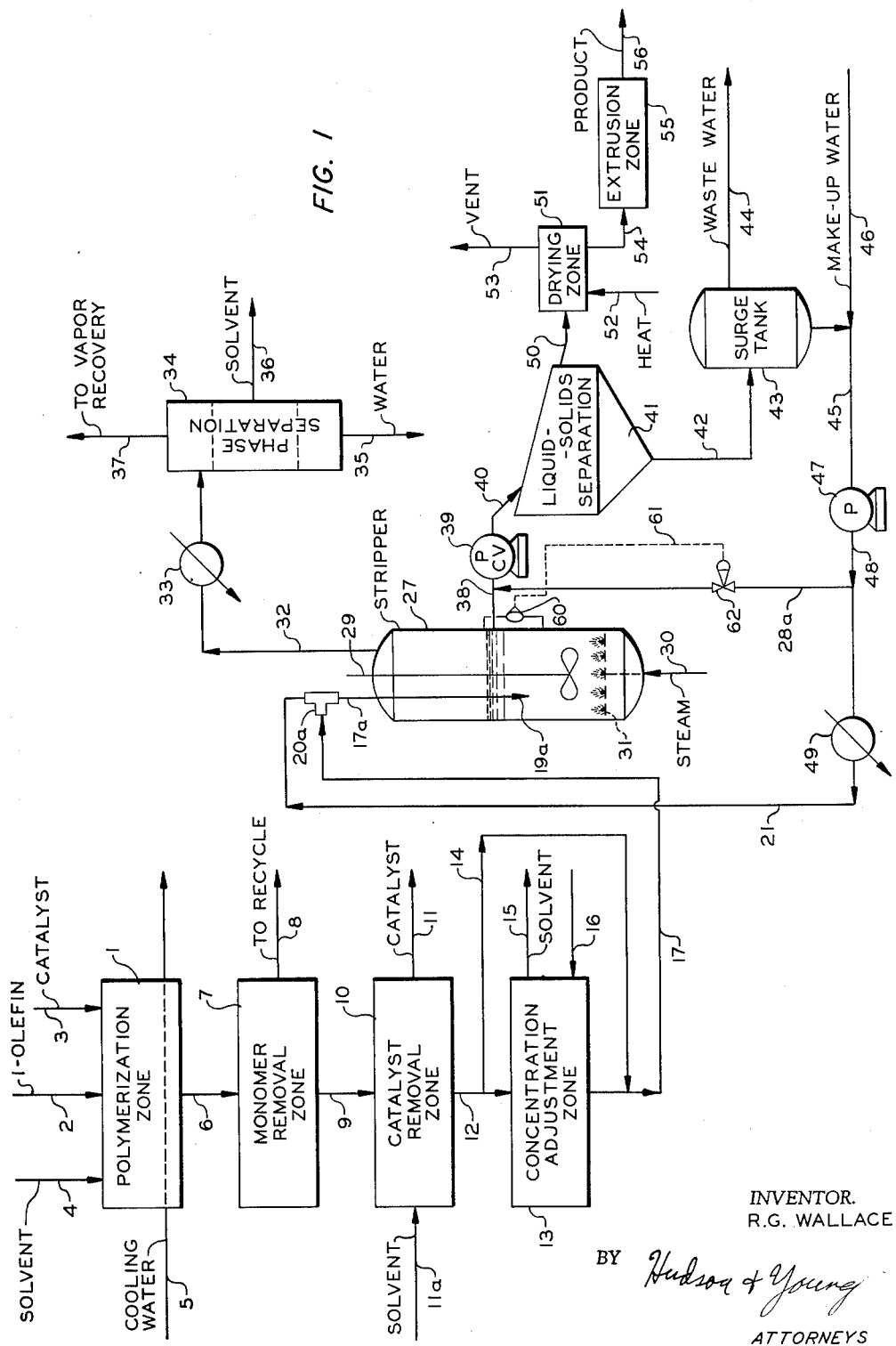

Oct. 2, 1962  R. G. WALLACE  3,056,772
RECOVERY OF 1-OLEFIN POLYMERS BY PRECIPITATION
Filed Feb. 3, 1958  4 Sheets-Sheet 1

INVENTOR.
R.G. WALLACE
BY Hudson & Young
ATTORNEYS

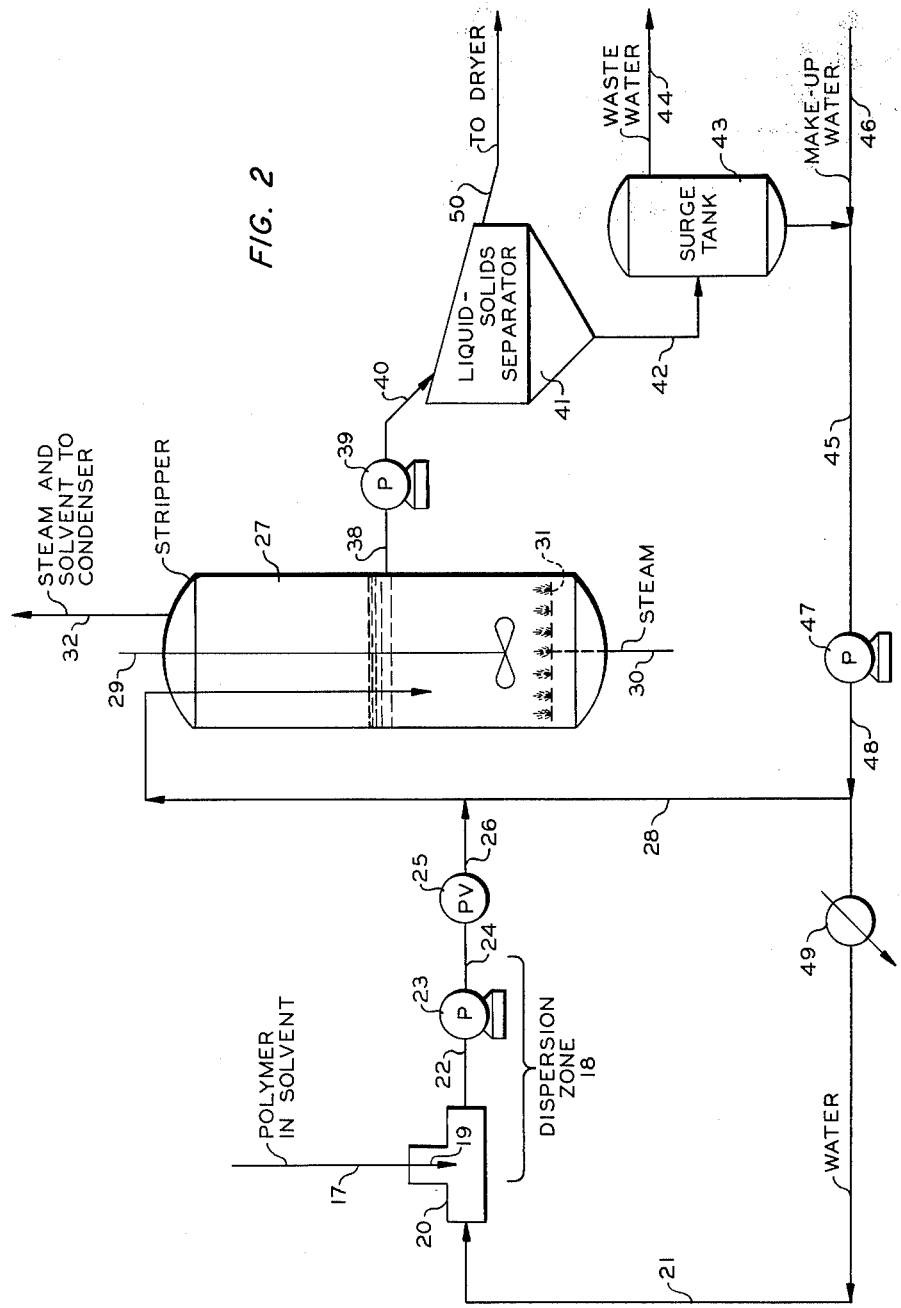

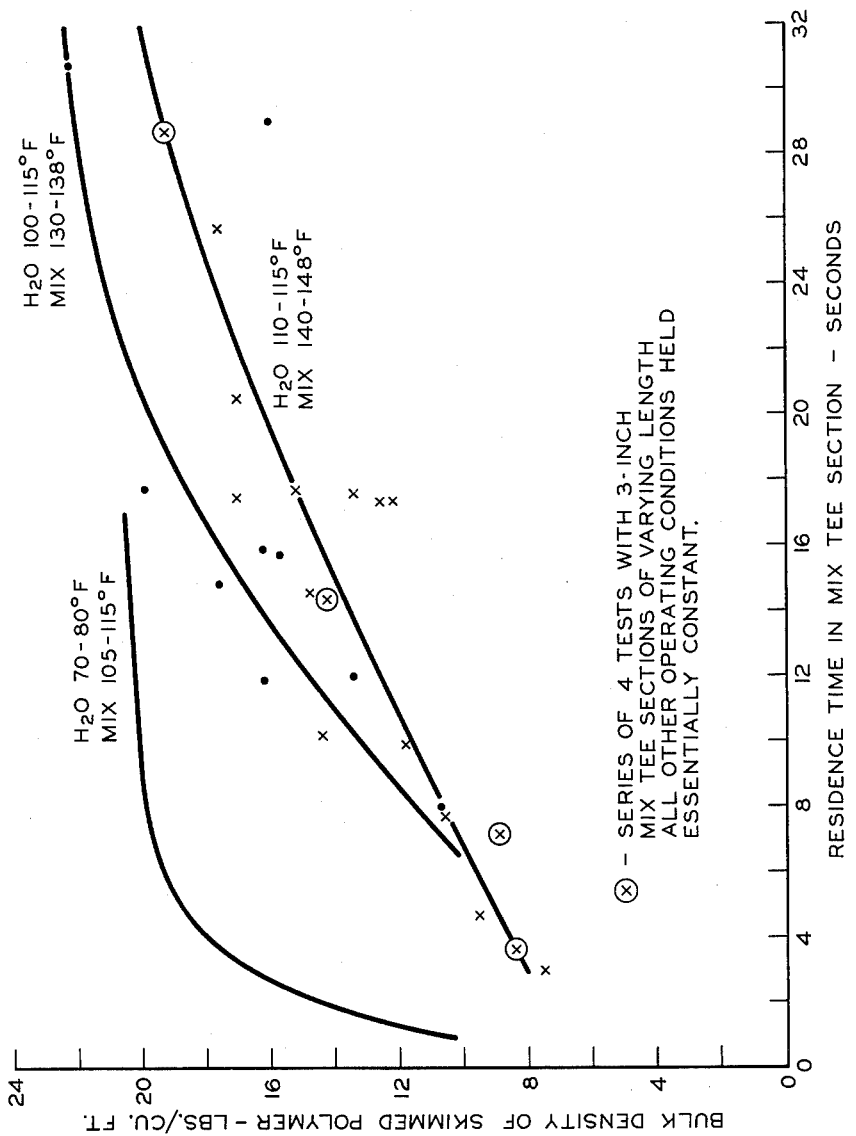

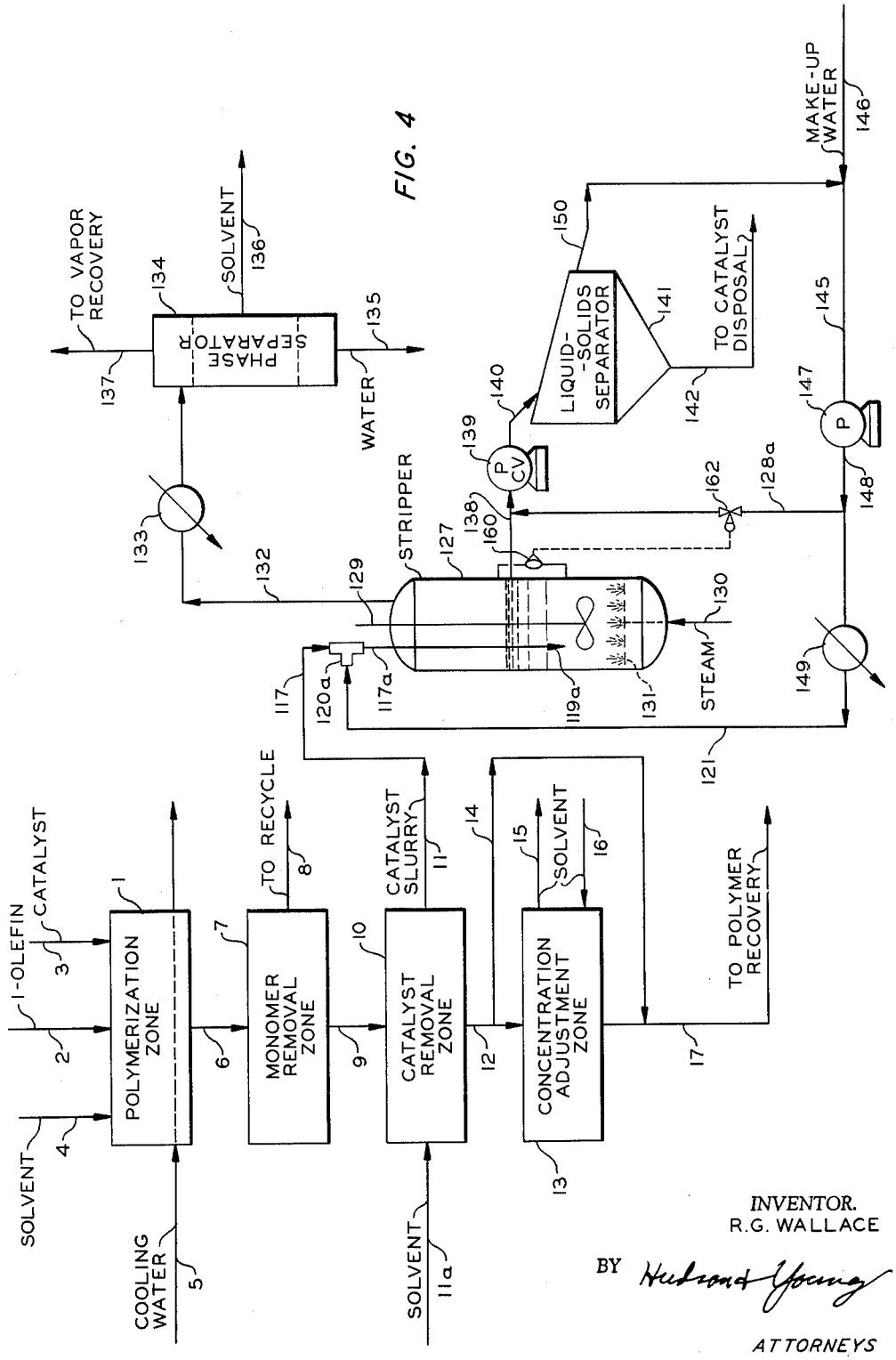

United States Patent Office

3,056,772
Patented Oct. 2, 1962

3,056,772
RECOVERY OF 1-OLEFIN POLYMERS BY PRECIPITATION
Robert G. Wallace, Pasadena, Tex., assignor to Phillips Petroleum Company, a corporation of Delaware
Filed Feb. 3, 1958, Ser. No. 712,908
12 Claims. (Cl. 260—94.9)

This invention relates to a novel process for the recovery of polymers of 1-olefins from hydrocarbon solutions thereof.

The method of this invention is applicable to recovery of 1-olefin polymers from solvents broadly. It had particular application to recovery of solid polymers from the solvent used in the polymerization of said 1-olefins. These polymers can be homopolymers or copolymers of one or more 1-olefins.

This is a continuation-in-part of my application for "Recovery of 1-Olefin Polymer by Precipitation," filed May 14, 1956, Serial No. 584,812, now abandoned.

It has been recently discovered that 1-olefins having a maximum of 8 carbon atoms per molecule and no branching nearer the double bond than the 4-position can be polymerized to solid and semi-solid polymers at low temperatures and pressures as compared with conventional processes for polymerizing these olefins. Such polymerization is generally carried out by first admixing and at least partially dissolving the olefins in a non-polymerizable solvent and carrying out the polymerization in the presence of a catalyst.

In the copending application of Hogan et al., filed March 26, 1956, and having Serial No. 573,877, now U.S. Patent 2,825,721 (March 4, 1958), a process is disclosed for producing novel polymers of 1-olefins by carrying out the polymerization at a temperature in the range of 100 to 500° F. in the presence of 0.1 to 10 or more weight percent of chromium as chromium oxide, including a substantial proportion of hexavalent chromium associated with at least one porous oxide selected from the group consisting of silica, alumina, zirconia and thoria. A preferred catalyst is one comprising 0.1 to 10 weight percent chromium as the oxide on a silica-alumina support such as 90 percent silica-10 percent alumina. This catalyst is a highly oxidized catalyst which has been activated by high-temperature treatment under non-reducing conditions and preferably with an oxidizing gas. Olefins, other than 1-olefins as described, are polymerized by the action of this catalyst but many of the resulting polymers are preponderantly normally liquid at least when polymerized under the described conditions. The polymerization is suitably carried out in the liquid phase, such as in solution in a hydrocarbon solvent, especially a paraffin or naphthene which is liquid under the polymerization conditions; however, vapor-phase operation or mixed-phase operation can be effected. Also, diolefins can be polymerized by the chromium oxide catalyst to produce solid polymers. As has been indicated, this invention is applicable to recovery of polymeric 1-olefins from solution broadly and is particularly applicable to recovery of polymer from the solvent as prepared by the above preferred method. However, polymers as prepared by other catalyst systems can be recovered by the method of this invention, e.g., polymers prepared by the organo-metallic catalyst as disclosed by Karl Ziegler in Belgium Patent 533,362.

These polymers of 1-olefins have been separated from hydrocarbon solvents by simple vacuum flashing, but this method produces a low bulk density and fibrous material. This material is difficult to handle and is unsuitable for certain uses. For example, when thin films are prepared from such material, it tends to result in an excessive quantity of "fish eyes." These "fish eyes" are believed to be due to difference in crystalline form, or possibly due to segregation of material of different molecular weight, or both. Regardless of the cause, the film is not homogeneous and is, therefore, objectionable to the trade. This fibrous material has a bulk density of approximately one pound per cubic foot and is difficult to handle and to dry completely. For example, extrusion equipment cannot be successfully operated with such a low density material. Further, the polymer, even if suitable for the intended purpose, still contains an appreciable amount of solvent. Drying of this material is a problem in that the removal of combustible vapors in conventional drying equipment is somewhat hazardous.

One object of this invention, therefore, is to provide a method of separating polymer from solvent.

In a different aspect, an object of this invention is to provide a means of recovering the polymer in a granular, high bulk density form.

In still another embodiment, an object of this invention is to recover used polymerization catalyst from a slurry thereof.

Other objects, advantages and features of this invention will be apparent to those skilled in the art having been given this disclosure.

According to this invention, a polymer of a 1-olefin dissolved in a hydrocarbon solvent is dispersed in water under conditions of pressure and temperature to maintain the solvent and water in the liquid phase, the resulting dispersion temperature is regulated so that the polymer is substantially all precipitated and the resulting solids are separated from the resulting two-phase liquid dispersion. When it is desired that the resulting polymer crumb be of the relatively high bulk density granular material, it is further necessary that the resulting dispersion temperature and residence time in this zone be controlled to insure complete solidification of the polymer.

As previously indicated, the polymeric materials to which this invention is particularly applicable are polymers of 1-olefins. Polymers of 1-olefins containing 2 to 8 carbon atoms and having no branching nearer the double bond than the 4-position have been found in recent years to have superior heat resistance and superior temperature properties when polymerized at relatively low temperatures and pressures. The herein identified method of Hogan et al. is one such low temperature-low pressure method. As indicated above, it is preferably to carry out the polymerization in a hydrocarbon solvent. This invention has particular use in recovering the polymer from the solvent.

Examples of the preferred 1-olefins include ethylene, propylene, 1-butene, 1-pentene, 1-hexene, 1-octene, 4-methyl-1-pentene, 4-methyl-1-hexene, 5-ethyl-1-hexene, 6-methyl-1-heptene, 4-ethyl-1-hexene, and the like.

The solvents especially useful in polymerization of the 1-olefins are hydrocarbons and preferably paraffins including cycloparaffins. These diluents include paraffins and cycloparaffins having 3 to 12 carbon atoms per molecule. Any of the paraffins or cycloparaffins which are a solvent for the polymer at the temperature in the polymerization range are suitable. Any hydrocarbon which is relatively inert, non-deleterious, and liquid under the operating conditions of the process can be utilized. Diluents that have been used successfully in the polymerization reaction and are operable in this invention include n-butane, isobutane, normal pentane, isopentane, isooctane (2,2,4-trimethyl pentane), cyclohexane and methylcyclohexane. Unsaturated aliphatic and cyclic hydrocarbons are, in general, not used in the polymerization reaction since they are likely to enter the polymerization reaction. However, any of these hydrocarbons are operable in the present invention.

In the preferred operation of this invention a hot polymer solution having a concentration in the range of 1 to 8 percent polymer is dispersed in 1 to 5 volumes of cool water to obtain the desired temperature under pressure conditions to maintain substantially all of the solvent and water in the liquid state until the polymer is precipitated and then the solvent is flashed off and the polymer is recovered. More preferably the concentration of polymers in solvent will be in the range of 2 to 5 percent. However, it should be understood that this invention is applicable to other concentrations both higher and lower and is operable with other water to solution ratios. The important thing is to cause the polymer to precipitate while the solvent and water are in the liquid state, i.e., before any substantial vaporization is permitted. I have found that while working in the above ranges, these conditions are readily obtainable.

As has been indicated, when a high bulk density, granular polymer is desired, the residence time in the dispersion zone must be sufficient to allow the polymer to completely harden. This time will be dependent upon the final mix temperature. For example, when recovering polyethylene prepared by the Hogan et al. method in cyclohexane with a final mix temperature of 105–115° F., time in the range 4 to 8 seconds is sufficient. On the other hand, with a final mix temperature in the range 140–148° F., the residence time should be in the range 30 to 35 seconds. As the final mix temperature approaches the precipitation temperature of the polymer, the time required becomes longer. As a practical consideration the maximum final temperature will generally not exceed about 150° F. and the residence time will not generally exceed about 60 seconds. With other polymers, these temperatures and times may vary, however, having been given this disclosure, it is within the skill of the art to determine the time and temperature required. However, it is not always necessary that the polymer be of the high bulk density type and fibrous material can be tolerated or even desired. In this case, the dispersion temperature and time need be only regulated so as to cause the polymer to precipitate. This embodiment is especially useful wherein it is desired to keep the stripping load on the polymer recovery system to a minimum.

By the processing of this invention, the solvent is essentially removed prior to the drying step and the advantage of obtaining a polymer free of combustibles prior to drying is obtained regardless of the physical nature of the polymer. The high bulk density in addition to being especially suitable for preparing film free of "fish eyes" is also more easily handled, dried and further processed such as by compacting by extrusion. In the case of polymers including copolymers, of ethylene, a bulk density of at least 10 pounds per cubic foot and higher, say up to 20 pounds, is frequently desired.

This invention can best be described by reference to the drawings attached hereto and forming a part of the specification of which:

FIGURE 1 is a flow diagram of a typical process incorporating the invention for use in recovering polymer as prepared by the Hogan et al. method wherein the precipitated dispersion is passed directly to a steam stripper; and FIGURE 2 is an alternative embodiment wherein the precipitated dispersion is added to the hot water recycle line of the steam stripper; and FIGURE 3 is a graph showing bulk density versus residence time at various mix temperatures when recovering highly crystalline polyethylene from cyclohexane.

FIGURE 4 shows an embodiment of this invention wherein a polymer-catalyst stream is being recovered.

Referring now to the drawing, a feed stream consisting essentially of the polymerizable 1-olefin, ethylene for example, is passed to polymerization zone 1 via conduit 2. Catalyst is introduced to said polymerization zone via conduit 3. The catalyst will usually be dispersed in at least a portion of the solvent. Any additional solvent (cyclohexane) is added to polymerization zone 1 via conduit 4. The ingredients in each of these conduits 2, 3 and 4 are preferably at polymerization temperatures (230–300° F.), however, one or more streams can be cooler with remaining streams warmer so that the resulting dispersion is at the proper temperature. It should also be understood that the 1-olefin and solvent can be premixed, if desired. The polymerization reaction is exothermic so that it is necessary to remove heat from the polymerization zone. This can be accomplished by indirect heat exchange, for example, cooling water in conduit 5. The polymerization zone effluent, at about 280° F. from zone 1 passes via conduit 6 to monomer removal zone 7 wherein unreacted ethylene is vaporized and removed via conduit 8 to ethylene recycle. The mixture passes from monomer removal zone 7 via conduit 9 to catalyst removal zone 10 wherein the solution and catalyst are separated. The catalyst is removed via conduit 11 such as flushing with solvent from conduit 11a. The polymer solution is passed from separation zone 10 via conduit 14. In general, the polyethylene concentration in conduit 12 is low and solvent is removed from zone 13 via conduit 15. On the other hand, if the concentration is high, solvent can be added via conduit 16. The solution is cooled in this zone, ether by evaporation or by cool solvent to about 240° F. The polyethylene concentration is adjusted to about 4.5 percent polymer in this example. In any case the polymer solution is dispersed in water of lower temperature so as to cause polymer to precipitate under such conditions that both the water and solvent remain as liquid phases. In this embodiment, the solution passes from conduit 17 to mixing T 20a where it is mixed with cool water from conduit 21. The mixture is maintained in the conduit 17a until the polymer is precipitated. In the embodiment shown, the conduit 17a extends into stripping zone 27 to a point below the surface of the liquid level wherein the dispersion is introduced directly into the body of the liquid via nozzle 19a. This nozzle also holds the pressure on the mix zone 17a sufficiently high to prevent flashing of solvent. However, it is within the scope of this invention to introduce the dispersion into the stripping zone at any position, e.g., above the water level. In this latter case, most of the solvent will be flashed as claimed in the copending application of N. F. McLeod having filing date of June 11, 1956, Serial Number 590,565 (see U.S. Patent 2,957,855, 1960). In the shown embodiment sufficient water is admixed with the solution to provide a resulting mix temperature in the range 105 to 115° F. and the leg 17a is large enough to provide a residence time of 4 to 8 seconds. This stripping zone can be operated at any desired temperature and pressure so long as solvent is vaporized. Preferably, the stripper will operate at atmospheric pressure and at about 170° F. However, under vacuum, the temperature will be lower, e.g., 140° F. for 7 p.s.i.a. Since the polymer is lighter than water and will float, an agitator 29 is provided to maintain the solids in dispersion. This agitator is rotated at a speed preferably in the range of 25 to 200 r.p.m. and in this example at about 85 r.p.m. While any means of supplying heat in the stripping zone can be used, steam is especially effective. Steam from conduit 30 is supplied to the steam stripper via steam nozzle head 31.

Steam and solvent vapor pass overhead from stripping zone 27 via conduit 32 to condenser 33, where most of the vapors are condensed, and then pass to separation zone 34. The solvent and water form two layers in this zone 34 and water is removed via conduit 35 while solvent is removed via conduit 36. Non-condensibles and uncondensed vapor pass overhead from zone 34 via conduit 37. The polymer residence time in this stripping zone is in the range of 20 to 30 minutes. Polymer in water slurry is removed from zone 27 via conduit 38 to constant volume pump 39 which may serve as a grinder and conduit 40 to separation zone 41. One convenient means for separating polymer and water is a skimmer tank; however, any suitable means can be employed.

The stripper 27 is provided with a liquid level control 60 which is operably connected to valve 62 via linkage 61. Valve 62 is operably installed in conduit 28a to regulate the flow of recycle water in conduit 28a to conduit 38 so that constant volume pump 39 controls the level in stripper 27 at the desired level.

Water from separation zone 41 passes via conduit 42 to surge tank 43. Conduit 44 is provided in surge tank 43 to remove excess water if required. The necessity for removing or adding water will be determined by the net loss or gain of water in stripping zone 27. The water in tank 43 will be at about the temperature maintained in said stripping zone, e.g., 170° F., in this example. This hot water is removed from the surge tank 43 via conduit 45 and pump 47. Make-up water can be added via conduit 46. If added at this point, the water should be preheated. If cold water is added, it should be added to conduit 21. The water from pump 47 is removed via conduit 48 and a portion passed through cooler 49 to conduit 21 and a portion passed as recycle to conduit 38 via conduit 28a as desired to maintain the liquid level in stripper 27.

The polymer from liquid-solids separation zone 41 is passed, still damp but having the solvent essentially replaced by water, to drying zone 51 via conduit 50. Heat is introduced into drying zone 51 via conduit 52. In this example, a forced draft dryer using air at 250° F. produced a dried polymer of 99.7 weight percent solids with a residence time in the range 2 to 4 hours. The dried polymer having a bulk density of 13 to 15 pounds per cubic foot was removed via conduit 54 to extruder 55 and the compacted material from said extruder removed via conduit 56. The recovered polymer can be removed directly from zone 51 via conduit 54 and sent to storage or otherwise processed as desired.

In FIGURE 2, the dispersion zone 18 comprises a nozzle 19 in mixing T 20 a second dispersing means such as pump 23. This pump can be a centrifugal pump or some other dispersing means such as a colloid mill to insure complete dispersion of polymer, diluent and water. The dispersion then passes via conduit 24 to pressure control valve 25 which maintains the desired pressure in the dispersion zone 18. The dispersion is then introduced into water recycle conduit 28 which passes the dispersion to zone 27.

In still another method of recovering the precipitated polymer, the slurry is passed to a separator where the mix will form a water phase, a diluent phase and solids phase; the water can be withdrawn and recirculated as shown and the polymer and diluent passed to a filter or centrifuge for separation of diluent and polymer, the polymer recovered and diluent recycled.

Those skilled in the art will see other modifications which can be made without departing from the scope of the invention. For example, the stripping in zone 27 can be carried out in a plurality of stages. Other separating means, such as a centrifuge and the like can be employed. Other valves, pumps and the like can be added as desired.

FIGURE 4 illustrates how the method of this invention can be used in the recovery of solvent from catalyst. The polymerization zone 1, the monomer removal zone 7, the catalyst removal zone 10 and concentration adjustment zone 13 are same as in FIGURE 1 and the connecting conduits are the same. The remaining zones shown are also same as shown in FIGURE 1 and carry the same reference numeral with 100 added. After the catalyst is removed by filtration, centrifuging or other suitable means, with or without a filter aid, the catalyst is slurried in solvent from conduit 11a and passes via conduit 117 to mixing T 120a wherein it is mixed with cool water from conduit 131 causing the catalyst to agglomerate into discrete particles. It is believed that the agglomeration is due to a small amount of polymer remaining on the catalyst and the solidification of this polymer. However, regardless of the cause, I have found that the catalyst does so agglomerate. The catalyst is then passed to stripping zone 127 where it is treated in the same manner as described in conjunction with the polymer in FIGURE 1. In this case, the catalyst is heavier than the water and agitation by means 129 is required. The draw off line 138 is shown near the upper level of the liquid, however, it can be lower if desired. The liquid solids separator 141 can be the same as separator 41, however, the catalyst being heavier, it is drawn off via conduit 142 and is passed to catalyst disposal or recovery zone, not shown. The liquid is removed via conduit 150 and is recycled via conduit 145 as described in conjunction with FIGURE 1.

Frequently an olefin is polymerized in a hydrocarbon such as pentane at a temperature where the polymer is solid as formed. In this latter case, a small amount of polymer is formed which remains soluble in the solvent, and when the polymer is separated from solvent, this soluble material is carried out with the solvent. Also, polymer is frequently recovered by precipitating polymer in solvent and here again a small amount of polymer remains soluble. In both of these latter cases, this soluble polymer can be recovered by the method of this invention. In all of these methods, a small amount of polymer is frequently entrained in solvent and is carried overhead to the solvent recovery systems. Such polymer is advantageously recovered by the method herein described.

To further illustrate the effectiveness of the process of this invention, the following tests were run. As previously indicated, when a polymer solution is flashed into a steam stripper or a vacuum flash zone, the resulting polymer is extremely light and fluffy. The bulk density of such a product averages about one pound per cubic foot.

*Example I*

In the first run, a 3.5 percent solution of polyethylene in cyclohexane at 248° F. was mixed with steam and injected into hot water at 212° F. in a tank at 6 pounds per square inch gauge. The product was very light and fibrous having a bulk density of 7 pounds per cubic foot when dried, resembling mutilated popcorn. This run demonstrated the disadvantage of permitting solvent to vaporize before the polymer is precipitated.

*Example II*

In a second run, a 3.5 percent solution of polyethylene in cyclohexane at 254° F. and feed rate of 337 pounds per hour was mixed with hot water at 174° F. and a feed rate of 470 pounds per hour and the mixture was injected into a steam stripper zone wherein the steam rate was 155 pounds per hour and the water temperature was 198° and the tank pressure was atmospheric. In this example, the solvent was at least partially evaporated by the steam and therefore the resulting polymer was lightweight and of the fibrous type.

*Example III*

A series of runs were made using the same polymer solution of Examples I and II but using various mixing and/or injection means. These runs were made as follows:

*Run 3.*—Precooling the polymer solution to 100° F. by mixing with cold water and charging the mixture below the water level of an agitated tank containing hot water for vaporization while holding a back pressure on the mixing zone to prevent solvent vaporization before precipitation of the polymer.

*Run 4.*—Precooling the solution to 100° F. by mixing with cold water and charging the mixture into a hot water recycle line to be conveyed to a point below the water level of an agitated tank containing hot water for vaporization, again holding a back pressure on the mixing zone to prevent solvent vaporization before precipitation of the polymer.

*Run 5.*—Injecting the hot polymer solution directly to the recycle line of run 4. Under this condition, the solvent was free to vaporize during the precipitation of polymer.

The results are shown in the following table:

| Run | Precooled Mixture Temp., °F. | Tank Temp., °F. | Recycle Water Rate, gals./min. | Product Bulk Density, lbs./cu. ft. |
|---|---|---|---|---|
| 3 | 105 | 172 | | 11.5 |
| 4 | 103 | 170 | 4 | 18.7 |
| 5 | | 171 | 17 | 4.1 |

From the above data, it can be seen that cooling the solvent by mixing with water and preventing vaporization before polymer precipitation resulted in a denser product. Reheating the mixture by adding to the recycle line had no adverse effect (compare runs 3 and 4). The improved result obtained in run 4 is believed due to the better dispersion obtained in the recycle line.

*Example IV*

A series of runs were made wherein the polymer was precipitated under sufficient pressure to prevent vaporization of solvent and utilizing different dispersion means.

In run 6, the solution-water dispersion was made by injecting the solution into the cool water stream by a spray nozzle, this dispersion was added to the water in the hot water (170° F.) agitated tank by use of a second spray nozzle. The pressure drop across first said spray nozzle was 45 p.s.i. and across second said spray nozzle was 115 p.s.i.

In run 7, the solution-water dispersion was made by injecting the solution into a cool water stream, and the mixture was passed through a colloid mill prior to introduction to a hot water (170° F.) agitated tank.

In run 8, a homogenizing pump was substituted for the colloid mill of run 7.

The results are tabulated below:

| Run | Percent Polymer in Solution | Solution Rate, #/hr. | Water Recycle Rate, g.p.m. | Mix. Temp., °F. | Bulk Density, lb./ft.³ |
|---|---|---|---|---|---|
| 6 | 3.7 | 410 | 8 | 125 | (¹) |
| 7 | 3.2 | 273 | 4 | 111 | 20.8 |
| 8 | 3.5 | 242 | 4 | 110 | 17.0 |

¹ Bulk density not determined but appeared to be uniform, medium sized, granular product comparable to that obtained in Runs 7 and 8.

From the above data, it is apparent that comparable products were obtained with each dispersion means. The spray nozzle is preferred, however, since it is relatively simple, inexpensive and since the polymer is formed away from the dispersion means so that a plugging tendency is avoided. That is, these other dispersing means have a tendency to plug when the operation is shut down.

*Example V*

A series of runs were made wherein polyethylene prepared with chromium oxide catalyst in cyclohexane solution was recovered by dispersing the solution into water at various temperatures and maintaining the resulting dispersions for various times. These data are tabulated below and are plotted in FIGURE 3. From this figure, it can readily be seen that the bulk density of the product is a function of mix temperature and residence time.

| Run | Water Feed, °F. | Mix Temp., °F. | Water/Polymer, g.p.m. | Bulk Density, lbs./cu. ft. | Residence Time, sec. |
|---|---|---|---|---|---|
| 1 | 72 | 117 | 1.4 | 20.5 | 4.35 |
| 2 | 76 | 118 | 1.4 | 18.9 | 4.35 |
| 3 | 73 | 113 | 1.4 | 10.2 | 0.87 |
| 4 | 75 | 115 | 1.4 | 16.2 | 2.62 |
| 5 | 72 | 114 | 1.4 | 14.0 | 1.74 |
| 6 | 73 | 115 | 1.4 | 19.4 | 7.0 |
| 7 | 84 | 115 | 1.4 | 20.5 | 17.4 |
| 8 | 75 | 119 | 1.4 | 17.3 | 5.05 |
| 9 | 75 | 120 | 1.4 | 15.5 | 2.5 |
| 10 | 71 | 113 | 1.4 | 12.9 | 1.26 |
| 11 | 78 | 111 | 1.4 | 9.4 | 0.63 |
| 12 | 73 | 114 | 1.4 | 8.9 | 0.32 |
| 13 | 74 | 117 | 1.4 | 15.2 | 4.5 |
| 14 | 74 | 113 | 1.4 | 13.9 | 2.2 |
| 15 | 73 | 100 | 1.4 | 5.2 | 0.1 |
| 16 | 114 | 136 | 2.7 | 16.2 | 11.9 |
| 17 | 115 | 135 | 2.8 | 13.4 | 12.0 |
| 18 | 100 | 129 | 2.0 | 17.6 | 14.8 |
| 19 | 100 | 134 | 2.0 | 22.2 | 30.7 |
| 20 | 104 | 133 | 1.9 | 16.0 | 29 |
| 21 | 105 | 138 | 1.8 | 10.7 | 8 |
| 22 | 99 | 133 | 1.4 | 19.9 | 17.7 |
| 23 | 110 | 135 | 2.25 | 16.2 | 15.9 |
| 24 | 115 | 136 | 1.95 | 15.7 | 14.7 |
| 25 | 115 | 148 | 1.6 | 15.2 | 17.7 |
| 26 | 115 | 148 | 1.5 | 9.6 | 4.7 |
| 27 | 113 | 145 | 1.8 | 13.7 | 32.9 |
| 28 | 112 | 144 | 1.7 | 19.2 | 28.6 |
| 29 | 112 | 144 | 1.7 | 14.2 | 14.3 |
| 30 | 112 | 147 | 1.7 | 8.9 | 7.2 |
| 31 | 111 | 144 | 1.7 | 8.4 | 3.6 |
| 32 | 111 | 145 | 1.7 | 17.0 | 20.5 |
| 33 | 111 | 144 | 1.7 | 14.4 | 10.2 |
| 34 | 111 | 146 | 1.7 | 11.9 | 14.2 |
| 35 | 112 | 149 | 1.7 | 11.8 | 9.9 |
| 36 | 114 | 147 | 1.7 | 13.4 | 33.7 |
| 37 | 111 | 141 | 1.9 | 17.6 | 25.7 |
| 38 | 112 | 146 | 1.9 | 10.6 | 7.7 |
| 39 | 106 | 145 | 1.4 | 17.0 | 17.4 |
| 40 | 110 | 140 | 1.4 | 13.4 | 17.6 |
| 41 | 100 | 144 | 1.1 | 7.5 | 3.0 |
| 42 | 117 | 140 | 1.8 | 14.5 | 14.7 |

The residence times are based only on straight pipe sections affixed to the T proper, ignoring increments additive for the pipe T and reducer. The polymer feed temperature was within the range 265–280° F. Various sizes of mix sections were used and total throughputs varied accordingly. Small plant equipment limitations with these changes probably account for most of scattering of data however, bulk density determinations were also subject to variations. The polymer concentration in the diluent was in the range 2½ to 4 weight percent.

I claim:
1. A process for recovering polyethylene as a relatively high bulk density material from a hot solution thereof in cyclohexane, said process comprising adjusting the concentration of said solution to a concentration within the range of 2 to 5 weight percent polyethylene, dispersing the resulting hot solution in cool water in a volume ratio within the range of 1 to 5 volumes water per volume of solution so that the resulting dispersion has a temperature not higher than 150° F., maintaining the cyclohexane and water of said dispersion in liquid phase for a time in the range 4 to 60 seconds until the polyethylene is substantially precipitated, passing the resulting two liquid phase-solid phase dispersion to an agitated steam stripping zone containing hot water therein, maintaining a lower pressure in said agitated steam stripping zone than is maintained on said dispersion thereby evaporating solvent, stirring said solid phase in said hot water while passing steam through the agitated dispersion, and thereafter separating polymer from said hot water.

2. A process for preparing polymeric 1-olefins in relatively high bulk density which comprises polymerizing a 1-olefin of 2 to 8 carbon atoms per molecule and having no branching nearer the double bond than the 4-position in a hydrocarbon solution, said hydrocarbon being selected from the group consisting of paraffins and cycloparaffins of 3 to 12 carbon atoms per molecule in the presence of 0.1 to 10 weight percent of a chromium as chromium oxide catalyst comprising a substantial amount of hexavalent chromium, said catalyst being associated with 90 to 99.9 percent of a porous oxide selected from the group consisting of silica, alumina, zirconia and thoria, said polymerization being carried out at a temperature in the range of 100 to 500° F. and above that at which solid polymer is precipitated and at a pressure sufficient to maintain the reactants and solvent in liquid phase, separating unreacted 1-olefin from the resulting polymer solution, adjusting the concentration to obtain a 2 to 5 percent solution of resulting polymer in solvent, separating catalyst from resulting polymer solution, dispersing resulting solution into cool water in a volume ratio of 1 to 5 volumes water per volume of solution so as to obtain a dispersion having a temperature below that at which polymer is precipitated, maintaining sufficient pressure on the resulting dispersion to maintain said solvent and said water in liquid phase for a time in the range 4 to 60 seconds and until said polymer is substantially precipitated, and separating resulting precipitated polymer from liquid.

3. The process of claim 2 wherein said 1-olefin is ethylene, said solvent is cyclohexane, the polymerization temperature is at least 170° F., and the resulting dispersion temperature is not greater than 150° F.

4. The process of claim 3 wherein the separation of said precipitated polymer from said liquid comprises stirring said dispersion in hot water in a steam stripping zone under reduced pressure to remove solvent, separating from the major portion of the hot water by filtration and drying the resulting polymer.

5. A process for recovering a normally solid polymer of ethylene from hydrocarbon solution thereof, said process comprising cooling said solution to precipitate said polymer by mixing said solution with water having a temperature below that at which said polymer precipitates as a solid, under pressure to maintain the hydrocarbon solvent and water substantially in liquid phase, maintaining said hydrocarbon and said water liquid phase without vaporization until said polymer precipitates in solid form, and thereafter vaporizing said solvent.

6. A process for separating a normally solid polymer of ethylene from solution thereof in a liquid hydrocarbon selected from the group consisting of paraffins and cycloparaffins having from 3 to 12 carbon atoms per molecule, said process comprising dispersing said solution, at a polymer concentration in the range 2 to 5 weight percent into water having a temperature below that at which said polymer precipitates as a solid, the ratio of water to solution being within the range 1 to 5 volumes of water per volume of solution, obtaining a dispersion at a temperature at which said polymer precipitates, maintaining the hydrocarbon solvent and water in liquid phase in said dispersion until the polymer precipitates as a granular solid, and thereafter separating precipitated polymer from liquid.

7. A process for recovering a normally solid polymer of a 1-olefin having from 2 to 8 carbon atoms per molecule and no branching nearer the double bond than the 4-position from solution of said polymer in a hydrocarbon selected from the group consisting of paraffins and cycloparaffins having from 3 to 12 carbon atoms per molecule, which process comprises adjusting the concentration of said solution to a value within the range 2 to 5 weight percent polymer, dispersing said solution into water to obtain a dispersion having a temperature below that at which said polymer is precipitated as a granular solid, the temperature of said water initially being below the temperature at which said polymer precipitates as solid, the ratio of water to solution being within the range 1 to 5 volumes of water per volume of solution, maintaining sufficient pressure on the resulting dispersion to maintain said solvent and said water in liquid phase in said dispersion for a time in the range 4 to 60 seconds and until said polymer is substantially precipitated in solid form, and separating resulting precipitated polymer from liquid.

8. A process for recovering a normally solid polymer of a 1-olefin having from 2 to 8 carbon atoms per molecule and no branching nearer the double bond than the 4-position from a solution in liquid hydrocarbon selected from the group consisting of paraffins and cycloparaffins having from 3 to 12 carbon atoms per molecule, which process comprises adjusting the polymer concentration of said solution to within the range 2 to 5 weight percent, dispersing the resulting solution into water having a temperature below that at which said polymer precipitates as a granular solid from solution, the volume ratio of water to said solution being in the range 1:1 to 5:1, so that the resulting dispersion has a temperature not higher than 150° F., maintaining said hydrocarbon and said water in said dispersion in liquid phase for a time in the range 4 to 60 seconds until said polymer is substantially precipitated, and substantially without vaporization, passing the resulting dispersion containing two liquid phases and a solid phase into a steam stripping zone containing water and maintained at a pressure lower than that previously maintained on said dispersion, thereby evaporating said hydrocarbon while stirring the resulting suspension of solid polymer in water and passing steam through the agitated dispersion, and thereafter separating polymer from said water.

9. A process for recovering a normally solid polymer of ethylene from a solution in a liquid hydrocarbon selected from the group consisting of paraffins and cycloparaffins having from 3 to 12 carbon atoms per molecule, which process comprises adjusting the polymer concentration of said solution to within the range 2 to 5 weight percent, dispersing the resulting solution into water having a temperature below that at which said polymer precipitates as a granular solid from solution, the volume ratio of water to said solution being in the range 1:1 to 5:1, so that the resulting dispersion has a temperature not higher than 150° F., maintaining said hydrocarbon and said water in said dispersion in liquid phase for a time in the range 4 to 60 seconds until said polymer is substantially precipitated, and substantially without vaporization, passing the resulting dispersion containing two liquid phases and a solid phase into a steam stripping zone containing water and maintained at a pressure lower than that previously maintained on said dispersion, thereby evaporating said hydrocarbon while stirring the resulting suspension of solid polymer in water and passing steam through the agitated dispersion, and thereafter separating polymer from said water.

10. A process for recovering polyethylene having a bulk density in the range 10 to 20 pounds per cubic foot from solution in a solvent selected from the group consisting of paraffins and cycloparaffins having from 3 to 12 carbon atoms per molecule, said process comprising dispersing said hot solution, in which the polymer concentration is in the range 2 to 5 weight percent, into water at a temperature below that at which said polymer precipitates and at a ratio within the range of 1 to 5 volumes water per volume of solution so that the resulting dispersion temperature is below the temperature at which fibrous polymer is formed, maintaining the pressure on said dispersion so as to maintain said solvent and water in liquid phase until said polyethylene is substantially precipitated in granular form, thereafter passing the dispersion to a steam stripping zone containing hot water and maintained at a lower pressure than that previously mentioned herein, whereby solvent is stripped from said polyethylene, and recovering polyethylene from the resulting hot water dispersion thereof.

11. A process for recovering a normally solid polymer of a 1-olefin having from 2 to 8 carbon atoms per molecule and no branching nearer the double bond than the 4-position from solution in a liquid hydrocarbon selected from the group consisting of paraffins and cycloparaffins having from 3 to 12 carbon atoms per molecule, which process comprises dispersing such solution, at a polymer concentration in the range 2 to 5 weight percent, into water having a temperature below that at which said polymer precipitates as a granular solid from solution, the volume ratio of water to said solution being in the range 1:1 to 5:1, the resulting dispersion having a temperature at which said polymer precipitates as a granular solid, maintaining said hydrocarbon and said water in said dispersion in liquid phase until said polymer is substantially precipitated as described, and substantially without vaporization, and separating precipitated polymer from accompanying liquid.

12. A process for recovering a normally solid polymer of a 1-olefin having from 2 to 8 carbon atoms per molecule and no branching nearer the double bond than the 4-position from solution in a liquid hydrocarbon selected from the group consisting of paraffins and cycloparaffins having from 3 to 12 carbon atoms per molecule, said process comprising cooling said solution to precipitate said polymer by mixing said solution with water having a temperature below that at which said polymer precipitates as a solid, under pressure to maintain the hydrocarbon solvent and water substantially in liquid phase, maintaining said hydrocarbon and said water in liquid phase without vaporization until said polymer precipitates in solid form, and thereafter vaporizing said solvent.

References Cited in the file of this patent

UNITED STATES PATENTS

| | | |
|---|---|---|
| 2,537,130 | Green | Jan. 9, 1951 |
| 2,731,452 | Field et al. | Jan. 17, 1956 |
| 2,825,721 | Hogan et al. | Mar. 4, 1958 |
| 2,838,477 | Roelen et al. | June 10, 1958 |
| 2,858,902 | Cottle | Nov. 4, 1958 |
| 2,860,125 | Lanning | Nov. 11, 1958 |